2,987,474
PREPARATION OF CONCENTRATED DISPERSIONS OF BASIC ALUMINUM SALTS
Abraham Wilson, Millstone, and Samuel James O'Brien, Dunellen, N.J., assignors to American Cyanamid Company, New York, N.Y., a corporation of Maine
No Drawing. Filed Mar. 21, 1957, Ser. No. 647,476
4 Claims. (Cl. 252—8.6)

The present invention relates to an improved process for the preparation of concentrated dispersions of basic aluminum salts of inorganic acids and to the dispersions so produced.

Heretofore, it has been customary to prepare dispersions of basic aluminum salts by the addition of alkaline materials as, for example, alkali and alkaline earth metal hydroxides, and the like, to an aqueous solution of an aluminum salt.

Utilization of this particular process step has a serious disadvantage, which is intensified when working with high concentrations of reactants in that during the conversion of the soluble aluminum salt to the less soluble basic salts a heavy rigid gel phase is formed.

The presence of this heavy rigid gel phase makes it extremely difficult, if not impossible, to obtain a uniform conversion of the soluble salt to the relatively insoluble basic salts if conventional equipment is employed. Fairly uniform conversions may be achieved by employing heavy duty mixing apparatus, an example of which is the well-known pug-mill. Such an alternative is obviously undesirable, in that excessive power is required to produce such uniform conversions, and production rates are greatly reduced, because of capacity of this general type of apparatus. Such an alternative is obviously unattractive, as it is not economical.

It is therefore an object of the present invention to provide a process for the preparation of concentrated dispersions of insoluble basic aluminum salts, which may be prepared without proceeding through the heavy rigid gel phase of the prior art methods.

It is a further object to provide a process for the preparation of concentrated dispersions of basic aluminum salts, which process may employ conventional plant equipment.

According to the present invention, a process is provided for producing concentrated dispersions of a basic aluminum salt of an inorganic mineral acid, which comprises adding, with stirring, and until an aqueous reaction mixture having a pH between about 6.5 and 8 is obtained, an aqueous solution of an aluminum salt of an inorganic acid to an aqueous solution of an alkaline material, such as ammonia, alkali, and alkaline earth metal oxides, hydroxides, carbonates, bicarbonates, and phosphates.

By "concentrated dispersion," as the term is used herein, is meant a dispersion of substantially insoluble basic aluminum salts containing from between 7.5 and 25% of said salts and preferably from between 10 and 20% of said salts.

By "aluminum salt of an inorganic mineral acid" is meant water soluble compounds of acids such as sulfuric, sulfurous, nitric, nitrous, hydrochloric, hydrobromic and the like. Examples of such salts include aluminum sulfate, aluminum chloride, aluminum nitrate and the like, and their various hydrates. These and other suitable salts may be used singly or in combination with one another. Of the enumerated soluble aluminum salts, aluminum sulfate is greatly preferred. The aluminum sulfate employed in the present invention may be any of the well-known hydrates of aluminum sulfate that are commercially available, but preferably is that hydrate of aluminum sulfate known as alum, which may have the chemical formula of $Al_2(SO_4)_3 \cdot 16H_2O$. Sometimes alum is reported as having 17 or 18 combined moles of water. These, as well as any of the hydrates, are fully contemplated by the instant invention.

In view of the fact that the present process is always carried out in an aqueous medium, the extent of hydration of the initial water-soluble aluminum salt is of no practical significance.

With regard to the alkaline material, it must be water soluble and capable of reacting in aqueous medium with the soluble aluminum salt to produce basic aluminum salts. Thereafter, primary consideration is given to the relative cost of suitable materials. Thus, in the present process, ammonia, alkali and alkaline earth metal oxides, hydroxides, carbonates, bicarbonates, and phosphates are considered to be most important. These materials may be employed singly or in combination with one another, where compatible.

The term "stirring," as it is employed herein, is intended to include mixing, agitating, and the like, which may be accomplished by any conventional means, which is not classifiable as heavy duty mixing, stirring, or agitating means, such as would be exemplified by a pug-mill being properly employed.

Thus, stirring, mixing, agitation, and the like, which may be accomplished only through the expenditure of large amounts of energy as, for example, in the case of a pug-mill that is being properly employed, are not intended to be included in the concept of "stirring" of this invention.

In the present process, the initial pH of the alkaline solution is normally of the order of between 8.5 and 12 and at the completion of the addition of soluble aluminum salt, which is preferably incremental, the pH value of the reaction mixture is from between about 6.5 and 8 and preferably between 6.5 and 7.5.

Thus, in order to obtain the desired reaction product, which is believed to be comprised of basic aluminum salts, the water-soluble aluminum salt is added to the alkaline solution until a pH within the above defined range is obtained. This pH value may be determined by employing a pH meter or indicator. Since one of the principal end uses for the final product is in the textile field, as a soil retardant material, the characteristic of the final dispersion having a substantially neutral pH is a highly desirable one.

While the amounts of water-soluble aluminum salt and water-soluble alkaline material employed in the present process are those amounts which will give a reaction mixture having a pH within the above indicated range, it has been determined that normally from between about 1.5 and about 2.9 equivalents of the alkaline reagent for 3 equivalents of the soluble aluminum salt are necessary to achieve a pH value within the above indicated range. Preferably, from between about 2.2 and about 2.7 equivalents of the alkaline reactant to 3 equivalents of the soluble aluminum salt are employed.

Employment of the reactants so that the resulting mixture has a pH within the values designated hereinabove results in products believed to have the following general formula:

$$Al(OH)_{3-x}(Y)_{x/z}$$

wherein $x$ is a value greater than 1.5 up to and including 2.9, Y is an anion of the soluble aluminum salt reactant of the present process, and $z$ is the valence of said anions.

The most critical feature of the present process is that the soluble aluminum salt of an inorganic mineral acid must be added to the alkaline solution in order to avoid the formation of an undesirable rigid gel phase. If the procedure is substantially reversed, that is, if the alkaline reactant is added to the soluble aluminum salt, an undesirable rigid gel-like material forms, which renders it substantially impossible to obtain a complete and/or uniform conversion of the soluble aluminum salt to its less soluble basic salts.

In carrying out the process of this invention, heat is not essential. However, it may be employed. If employed, care must be taken that the addition of the reagents is carried out to about the neutral point of water at the elevated temperature. This means adjusting the pH measurements to the temperature of the reaction, either instrumentally or by a correction factor. In some instances, the use of heat may tend to produce gelation in the early stages of the reaction. Thus, since it is not essential to the present process, it is frequently preferred not to employ it.

In order that the present invention may be more fully understood, the following examples are given primarily by way of illustration. No details therein should be construed as limitations on the present invention, except as they appear in the appended claims. All parts and percentages are by weight unless otherwise designated.

EXAMPLE 1

Into a suitable reaction vessel equipped with stirrer and pH electrode, 1,000 parts of sodium carbonate solution (3.78 equivalents) was added. The initial pH was 11.5. Liquid alum (a solution containing aluminum sulfate $(Al_2(SO_4)_3.16H_2O)$ containing 54% solids, was then added in approximately 50-part increments over a one-half hour period. Precipitation began immediately. Evolution of carbon dioxide was vigorous throughout the addition, because of localized depletion of hydroxyl ions in the vicinity of the precipitate. In order to avoid build-up of foam, rapid and continuous stirring was employed.

The addition of the alum was continued until the pH dropped to 7.1 and stirring was continued for one hour to break up large floc formations.

To carry the reaction to the above stated pH value with a total of 547 parts (2.69 equivalents) of the liquid alum was employed.

Total solids as determined by oven heating at 110° C. for a 24-hour period was 22.2%. In this preparation, the reaction was carried to completion without the occurrence of a heavy gelatinous rigid phase. The mixture was easily stirred at all times.

If the procedure of this example is reversed and the alkaline solution is added to the soluble aluminum sulfate, the reaction mixture becomes quite rigid and extremely difficult to work with.

EXAMPLE 2

Into a suitable reaction vessel, a 20% solution of sodium carbonate containing 0.926 equivalent is placed. Thereafter, a 20% solution of aluminum chloride containing 0.465 equivalent is added thereto with rapid stirring. Precipitation is substantially immediate and at no time were rigid gel formations observed or encountered.

The final dispersion has a pH of 7.1 and has a solids content of 19.13%. These solids are believed to be principally $Al(OH)_{2.8}Cl_{0.2}$.

EXAMPLE 3

Into a suitable reaction vessel, a 10% solution of trisodium phosphate containing 0.654 equivalent is placed. A 20% solution of aluminum chloride (0.546 equivalent) is added thereto with rapid stirring. Precipitation is substantially immediate and at no point involved gel formation.

The dispersion has a final pH of 7.2, a solids content of 17.60% and would be considered a fairly free-flowing dispersion.

Because of the hydrolysis of the phosphate in this example, it is difficult to ascertain the principal constituent of the precipitated solids.

EXAMPLE 4

A 20% solution of sodium carbonate containing 2 equivalents is placed in a suitable reaction vessel. Thereafter, a 25% solution of aluminum nitrate (1.4 equivalents) is added thereto with rapid stirring. Precipitation is substantially immediate and is not accompanied by gel formation. The pH of the final dispersion is 7.0 and has a solids content of 20%. These solids are believed to be principally $Al(OH)_{2.8}(NO_3)_{0.2}$.

If the procedure of the example is reversed and the alkaline solution is added to the soluble aluminum nitrate, the reaction mixture becomes quite rigid and, for practical purposes, unsuitable.

In addition to the avoidance of the formation of a rigid gel phase during the preparation of basic aluminum salt, the present invention has many other desirable aspects. The solid precipitate produced by employing the present process may be dried into a powdery state and readily redispersed in aqueous medium without employing dispersing or surface active agents to produce stable dispersions. This permits these materials to be dried down and thus more commercially desirable in that large excesses or quantities of water need not be shipped. In addition, if desired, they may be used in their prepared state, in that a free-flowing stable dispersion results. In either case, these dispersions have an ultimate particle size of less than about .5 micron.

One of the principal end uses of the basic aluminum salts, and particularly the sulfate, of the present invention, is their function as soil retardants when properly applied to surfaces which normally attract soil. In order to illustrate this utility of the basic aluminum salts prepared according to the present process, the product of Example 1 was tested as a soil retardant. This material was diluted with water to form dispersions containing 1% solids and application was made on viscose carpeting in a manner described in the American Dyestuff Reporter, volume 45, No. 7, pages 190–202, March 1956. In the table hereinbelow, the results of this application are compared with a commercial soil retardant material.

The soiling index reported herein is determined by taking the apparent soil before and after soiling of similar pieces of treated and untreated carpeting. The apparent soil for the untreated soiled piece is then divided into the apparent soil for the treated soiled piece, to arrive at the soiling index.

The apparent soil index is defined in the above cited reference (P–199) by the equation:

Apparent soil $= [(1-R_s)^2/2R_s] - [(1-R_u)^2/2R_u]$ where $R_s$ and $R_u$ are the reflectance values of soiled and unsoiled samples of the same material.

Test results are as follows:

*Table A*

| Materials | SR #1 [1] | Example 1 |
| --- | --- | --- |
| Apparent soil index | 0.51, .49 [2] | 0.57, .53. |
| Dusting | None | None. |
| Yellowing: | | |
|   Initial | Standard [3] | Equal. |
|   After heat aging 10 min. at 300° F. | Standard | Equal. |
| Hand | Standard | Equal. |
| Whitening | Some | None. |

[1] SR #1—Commercially available soil retardant that contains aluminum phosphate.
[2] The lower the number, the better.
[3] An assigned value. Other values relative with respect thereto.

For purposes of imparting soil retardant properties, the basic aluminum salts of the present invention may be applied to textile materials such as cotton, rayon, wool, and the like, by padding, spraying, immersion or other means. A principal utility of these basic salts is on pile fabrics such as are employed in carpeting and the like.

When applied, as by immersion, spraying, padding, exhaustion, or the like, to textile materials, amounts of the order of 0.25 to 5%, based on the weight of the material, are employed. With respect to pile fabric, this range may be based on the weight of the pile. Preferably, amounts of from between 0.5% to 2.5% are employed. Treated textile materials may be dried at temperatures between 80 and 125° C. in heated chambers, tumble driers, or other suitable equipment.

In addition, however, these materials may be applied to wallpaper, lamp shades, window shades, and the like, for purposes of retarding soiling. When applied to such surfaces, as by brushing, roller coating, and the like, from a 20% solids dispersion, amounts of from between 1⅓ and 6¾ ounces per square yard and preferably about 3 ounces per square yard are employed.

As soil retardants, the basic aluminum salts of the present invention may be mixed with other soil retardant materials, such as normal phosphates, silicates, and titania hydrates which are generally considered to be non-basic in character. In addition, other materials may be used therewith which do not impair the soil retardancy of the dispersions, such as softeners, lubricants, and the like.

We claim:

1. A process for preparing concentrated aqueous dispersions containing from between 7.5 and 25% of a water insoluble basic aluminum salt of an inorganic mineral acid, which comprises adding with stirring a water soluble aluminum salt of an inorganic mineral acid to a water soluble inorganic alkaline material until an aqueous dispersion having a pH between about 6.5 and 8 containing said basic aluminum salt is obtained, said alkaline material and said water soluble aluminum salt being employed in relative equivalent amounts of from between about 1.5 and about 2.9 equivalent of said alkaline material for 3 equivalents of the soluble aluminum salt.

2. A process according to claim 1 wherein the water soluble aluminum salt is aluminum sulfate.

3. A process according to claim 1 wherein the water soluble aluminum salt is aluminum chloride.

4. A process according to claim 1 wherein the water soluble aluminum salt is aluminum nitrate.

References Cited in the file of this patent

UNITED STATES PATENTS

| | | |
|---|---|---|
| 671,760 | Florin | Apr. 9, 1901 |
| 2,138,840 | De Cew | Dec. 6, 1938 |
| 2,154,170 | Kramer | Apr. 11, 1939 |
| 2,797,978 | Beekman | July 2, 1957 |